United States Patent [19]

Haines

[11] 4,244,028

[45] Jan. 6, 1981

[54] DIGITAL MICROPROCESSOR HAVING A TIME-SHARED ADDER

[75] Inventor: Ralph W. Haines, Santa Clara, Calif.

[73] Assignee: National Semiconductor Corporation, Santa Clara, Calif.

[21] Appl. No.: 18,752

[22] Filed: Mar. 8, 1979

[51] Int. Cl.³ .............................................. G06F 7/50
[52] U.S. Cl. .................................. 364/712; 364/900
[58] Field of Search ...................... 364/712, 200, 900

[56] References Cited

U.S. PATENT DOCUMENTS

| | | | |
|---|---|---|---|
| 3,980,992 | 9/1976 | Levy et al. ............................ | 364/200 |
| 3,990,052 | 11/1976 | Gruner ................................... | 364/200 |
| 4,021,656 | 5/1977 | Caudel et al. ......................... | 364/712 X |
| 4,144,563 | 3/1979 | Heuer et al. .......................... | 364/200 |

Primary Examiner—David H. Malzahn
Attorney, Agent, or Firm—Brown & Martin

[57] ABSTRACT

The disclosed microprocessor time-shares an adder with a data memory, an accumulator, an I/O register, and an edge detector. This time-sharing is synchronized by a timing generator that produces interleaved first and second clocked pulses. Instructions are fetched from an instruction memory during the first clock pulses and are performed during the second clock pulses. To perform these instructions, the contents of the data memory and the accumulator are passed through the adder and fed back to the accumulator. In addition, during the first clock pulses, the contents of the I/O register and the output of the edge detector are passed through the adder and fed back to the I/O register. This allows the I/O register to be used as a counter while simultaneously allowing the structure of the I/O register to be greatly simplified.

8 Claims, 4 Drawing Figures

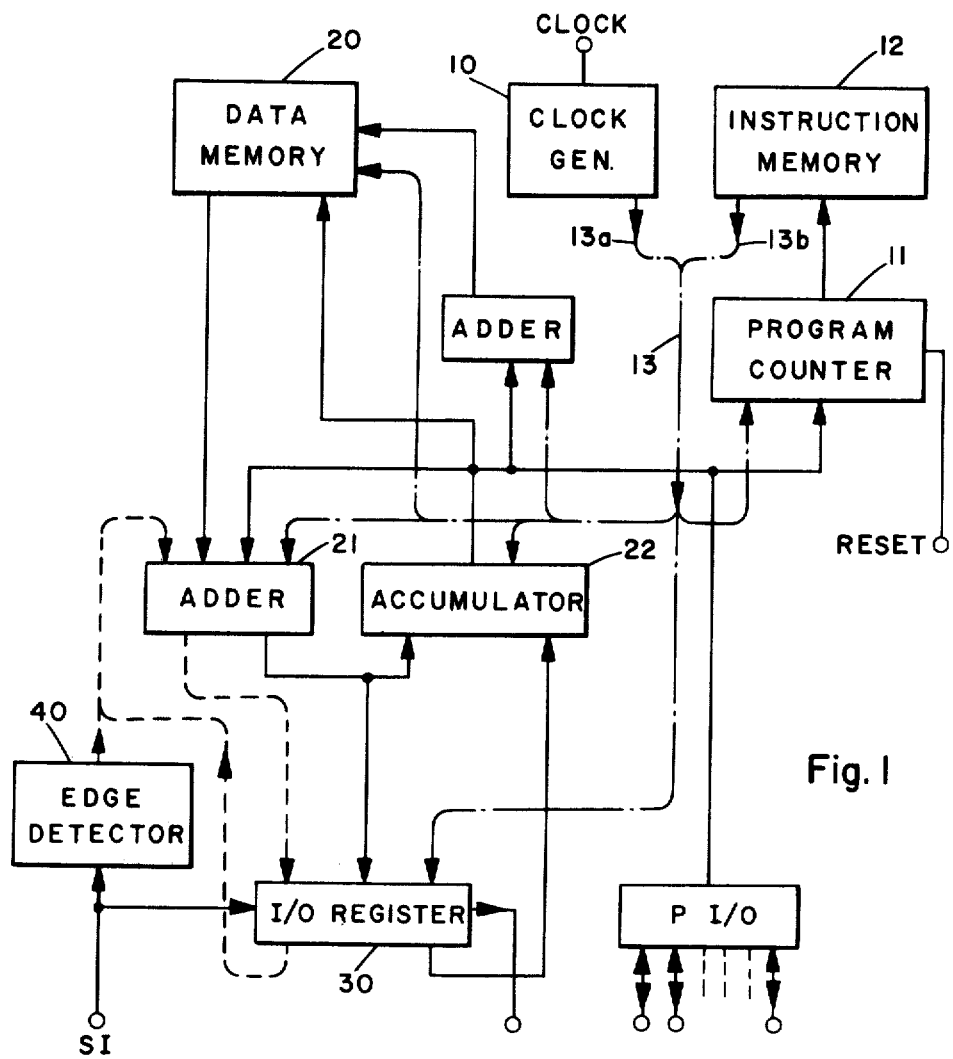
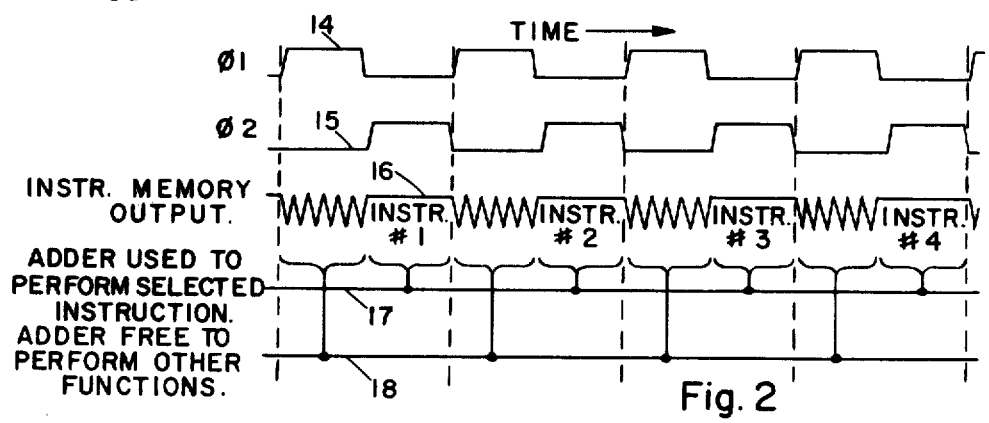
Fig. 1
Fig. 2

DIGITAL MICROPROCESSOR HAVING A TIME-SHARED ADDER

BACKGROUND OF THE INVENTION

This invention relates to digital computers, and more particularly microprocessors that are constructed on a single semiconductor chip. Typically, such microprocessors include an adder, a data memory, and an accumulator. These components are interconnected to perform various instructions that are stored in an instruction memory. For example, one instruction which practically all microprocessors perform is to pass data from the data memory and accumulator through the adder and back to the accumulator.

All of the microprocessors in the prior art also have some input/output or "I/O" registers. These allow the microprocessor to transmit information to and receive information from external devices. The I/O registers are loaded and unloaded under control of instructions from the instruction memory.

In the disclosed invention, the I/O register functions not simply as a means for transmitting and receiving information, but also as an external event counter. That is, it can be loaded with some initial value, and then can subsequently be incremented in response to an external signal.

In the prior art, many microprocessors do not provide this function at all. Further, those microprocessors that do provide an I/O register with incrementing capabitity utilize considerably more hardware than does the disclosed invention. For example, some microprocessors simply provide a second adder. This second adder receives inputs from the I/O register and the external signal and provides an output back to the I/O register. An alternative implementation would be to construct the I/O register of triggerable flip-flops which are interconnected to form a counter.

Both of these implementations however, require substantial amounts of hardware which in turn utilize corresponding amounts of space on the chip. And chip space is of course, at a premium. Thus, it is highly desirable to reduce the hardware and corresponding space that is required to implement an external event counter on a digital microprocessor chip.

Accordingly, it is one object of the invention to provide an improved microprocessor on a semiconductor chip.

Another object of the invention is to provide a microprocessor having an external I/O event counter that uses reduced hardware.

SUMMARY OF THE INVENTION

These and other objects are accomplished in accordance with the invention by a microprocessor having a timeshared adder. The microprocessor includes a timing generator that generates interleaved first and second clock pulses. During the first clock pulses, instructions that are to be performed are read from an instruction memory; and during the second clock pulses, the instructions are actually performed. Instruction performance includes utilization of the adder in various ways, such as passing data from a data memory and an accumulator through the adder and back to the accumulator.

During the first clock pulses however, the adder is not used to perform instructions, and thus it is free to perform other functions. Specifically, during the first clock pulses, an I/O register and an external event counter are coupled to the adder, and the output of the adder is fed back to the I/O register. Various control circuits are included for gating the correct inputs to the adder and for gating the output of the adder to the correct destination during the first and second clock pulses.

BRIEF DESCRIPTION OF THE DRAWINGS

The preferred embodiments of the invention will best be understood by reference to the following Detailed Description when read in conjunction with the following drawings wherein:

FIG. 1 is a block diagram of a microprocessor constructed according to the invention which is designed to be fabricated on a semiconductor chip.

FIG. 2 is a timing diagram illustrating the time sharing of an adder in the microprocessor of FIG. 1.

DETAILED DESCRIPTION

Figure 3:
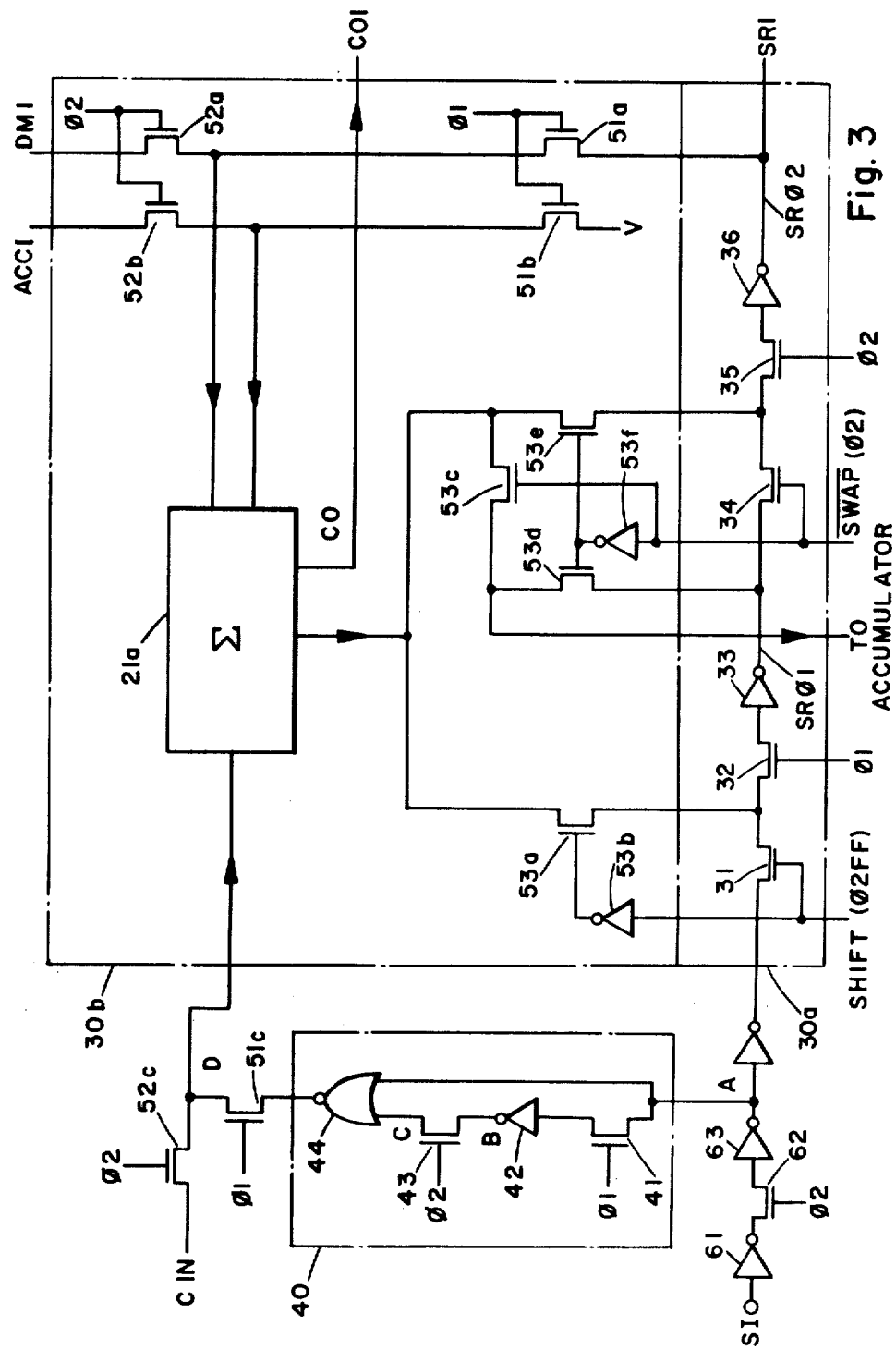
FIG. 3 is a detailed circuit diagram of the external event counter and one stage of the adder and I/O register of the FIG. 1 microprocessor.

A preferred embodiment of one microprocessor constructed according to the invention will now be described in conjunction with the FIG. 1. All of the timing and control signals in this embodiment are provided by a clock generator 10, a program counter 11, and an instruction memory 12. Specifically, clock generator 10 produces interleaved clock pulses $\phi 1$ and $\phi 2$ on leads 13a; and program counter 11 and instruction memory 12 produce sequential instructions on leads 13b.

A timing diagram of clock pulses $\phi 1$, $\phi 2$ and the instructions is illustrated in FIG. 2. Basically, during clock pulses $\phi 1$ the instructions are fetched from instruction memory 12; whereas, during clock pulses $\phi 2$ the instructions are executed. This timing sequence is illustrated by waveforms 14, 15, and 16.

To execute the instructions, the microprocessor further includes a data memory 20, an adder 21, and an accumulator 22. Typically, during one instruction, digital signals from memory 20 and from accumulator 22 are fed into adder 21; and the output of the adder is fed back to accumulator 22. This operation occurs in response to the control signals on leads 13 that are applied to adder 21 and accumulator 22.

To perform the above described operation, it is only necessary for adder 21 to be dedicated to receive signals from data memory 20 and accumulator 22 during clock pulses $\phi 2$. That is, during clock pulses $\phi 1$ adder 21 is free to perform other functions. This time sharing of adder 21 is indicated by reference numerals 17 and 18 in FIG. 2.

In the illustrated preferred embodiment of FIG. 1, adder 21 is time shared to implement an external event counter. That is accomplished in part by providing an I/O register 30, and an edge detector 40. During clock pulses $\phi 1$, register 30 and detector 40 are coupled to the input of adder 21, and the adder is in turn coupled back to the register. This is indicated via dashed lines in FIG. 1. Data is transferred along the dashed line paths during clock period $\phi 1$ and along the solid line paths during clock period $\phi 2$.

Referring now to FIG. 3, a detailed circuit diagram of the edge detector as well as one stage of the adder, the shift register, and their interconnections will be described. Reference numerals 30a, 21a, and 30b respectivley indicate one stage of shift register 30, one stage of adder 21, and the associated control circuits. In one preferred embodiment, register 30 and adder 21 each contain four stages.

Each stage 30a of the shift register includes a pair of serially connected MOS transistors 31 and 32, and an inverter 33. These are followed by another pair of serially interconnected MOS transistors 34 and 35 and another inverter 36. Transistors 32 and 35 respectivey are gated by the previously described clock pulses φ1 and φ2.

In comparison, transistors 31 and 34 are gated by control signals from instruction memory 12. Basically, they provide part of the control whereby during clocks φ1, shift register 30 may be selectively loaded with the sum of its present value plus the output of edge detector 40. In addition, they provide part of the control whereby during clocks φ2, shift register 30 may be loaded with the sum of accumulator 22 and data memory 20. Further, they provide part of the control whereby shift register 30 may be serially loaded with an externally supplied input signal SI.

To further implement these functions, there is provided phase one and phase two input controls to the adder. The former are indicated via reference numerals 51a through 51c; and the latter are indicated via reference numerals 52a through 52c.

Also there is provided output control circuits which selectively couple the output of the adder to either the shift register or the accumulator. These are indicated via reference numerals 53a through 53f. Basically, circuits 53a, 53b and 31 are utilized to gate either the output of the adder or signal SI into the shift register during timing period φ1; whereas circuits 53c through 53f along with transistor 34 operate to direct the output of the adder and operation of the shift register during clock period φ1.

Figure 4:
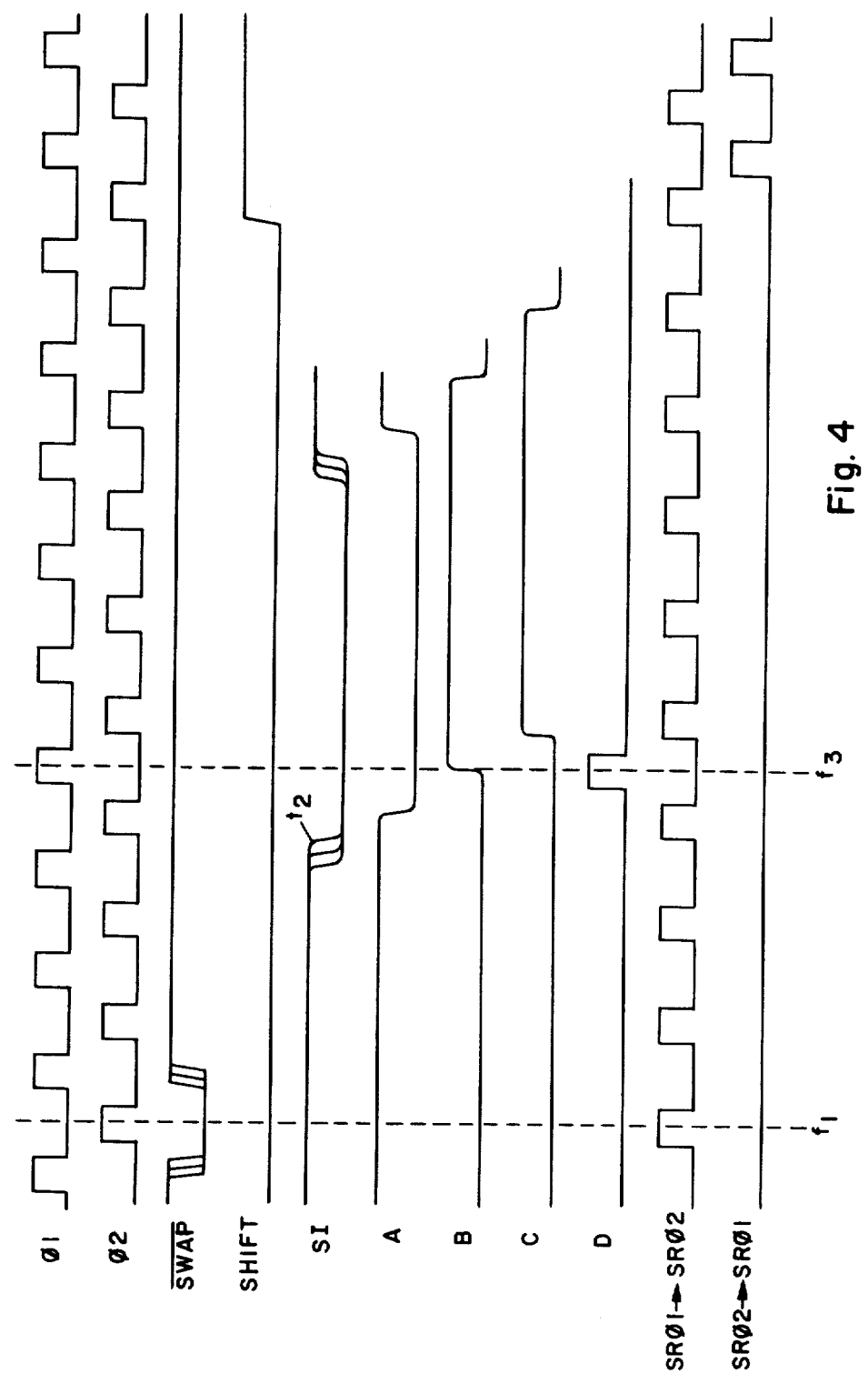
FIG. 4 is a timing diagram illustrating the operation of the FIG. 3 circuit.

The operation of the above described circuitry is illustrated in greater detail in the timing diagram of FIG. 4. One operation which this diagram illustrates is that in which data from the accumulator and I/O register are interchanged. This function occurs at time instant T1 where the control signal $\overline{SWAP}$ on the gate of transistor 34 and the control signal $\overline{SHIFT}$ on the gate of transistor 31 are both low. Signal $\overline{SWAP}$ comes directly from instruction memory 12 and thus, it is firm only during the time that clock φ2 is true. In comparison, signal SHIFT is stored in a flip-flop. It is synchronized with clocking signal φ2.

With signal $\overline{SWAP}$ low, transistors 34 and 53c are turned off, whereas transistors 53d and 53e are turned on. Accordingly, the output of the adder is transferred through transistor 53e, through transistor 35, and stored at the output of inverter 36. Simultaneously, the output of inverter 33 is transferred through transistor 53d to the input of the accumulator. These transfers occur during clock time φ2. They may be used for example, to initialize shift register 30 to some predetermined value which is subsequentially incremented by signals from event counter 40.

The actual counting of an event is the next function that FIG. 4 illustrates. It occurs in response to signal $\overline{SWAP}$ being high, and signal SHIFT being low. Under these conditions, the adder output is gated through transistors 53a and 32, and is stored at the output of inverter 33. This occurs during clock period φ1. Subsequently, at time period φ2, the output of inverter 33 is transferred through transistors 34 and 35 and stored at the output of inverter 36. This cycle is repeated so long as the control signals $\overline{SWAP}$ and SHIFT respectively remain high and low.

In the FIG. 4 timing diagram, signal SI on the input pin makes a high to low transition at time instant T2. This signal is transferred through an inverter 61, and is sampled and held as signal A by a transistor 62 and an inverter 63. Signal A is in turn sampled and held by another transistor 41 and inverter 42. The output of inverter 42 is indicated as a signal B. Signal B is then passed through a transistor 43 at time period φ2 and fed into one input of a NOR gate 44. Another input of gate 44 receives signal A. Transistor 51c then passes the output of NOR gate 44 as signal D to the adder during clock period φ1.

Signal D is illustrated at time instant T3 in FIG. 4. At that time instant, the output of the adder equals the content of the shift register as stored at the output of inverters 36 plus one. This sum is fed through transistors 53a and 32 and stored at the output of inverter 33. Subsequently, during the following φ2 clock period, this value is transferred and stored to the output of inverter 36.

At the end of the above described external event counting operation, the latest value of the shift register may be stored in the accumulator as was described with reference to time instant T1. Alternatively, the shift register may be serially unloaded and read by an external device. This is accomplished by forcing control signals $\overline{SWAP}$ and SHIFT both high. In that state, signal SHIFT turns on transistor 31 in each of the shift register stages. As a result, the output of inverter 36 from one stage is transferred through transistors 31 and 32 to the output of inverter 33 of the following stage. This transfer occurs during time period φ1. Subsequently, during time period φ2 the output of inverter 33 is transferred to the output of inverter 36. This sequence continues so long as signals SWAP and SHIFT both remain high.

Various preferred embodiments of the invention have now been described in detail. In addition however, many changes and modifications may be made thereto without departing from the nature and spirit of the invention. Thus, it is to be understood that the invention is not limited to said details but is defined by the appended claims.

I claim:

1. A digital microprocessor chip including:
    an adder, a data memory, an accumulator, and an I/O register;
    timing generator means for generating interleaved first and second clock pulses;
    edge detection means having an input connected to an I/O pin for receiving an externally supplied digital signal, and having an output for generating thereon a single pulse synchronized with said first clock pulses each time said digital signal makes a predetermined transition;
    phase one input control means for coupling the output of said edge detection means and said I/O register to inputs on said digital adder when said first clock pulses are true;
    phase two input control means for coupling said digital memory and said accumulator to said inputs on said digital adder when said second clock pulses are true; and output control means for selectively coupling the output of said adder to said I/O register when said first clock pulses are true and to said accumulator when said second clock pulses are true.

2. A microprocessor chip according to claim 1 wherein said adder, data memory, accumulator, I/O register, edge detection means, and all of said control means are comprised of MOS transistors.

3. A microprocessor chip according to claim 2 wherein said I/O register consists of a plurality of serially interconnected stages, and wherein each of said stages includes the serial combination of first and second MOS transistors, a first inverter, third and fourth MOS transistors, and a second inverter.

4. A microprocessor chip according to claim 3 wherein said phase one input control means includes a single MOS transistor connected the output of said edge detection means to a carry input on said adder and also includes for each stage of said adder, a pair of MOS transistors coupling the output of said second inverter and a predetermined voltage to said adder.

5. A microprocessor chip according to claim 4 wherein said output control means includes for each stage of said I/O register a first MOS transistor coupling the output of said adder to the junction between said first and second MOS transistors, and a second MOS transistor coupling the output of said adder to said accumulator.

6. A microprocessor chip according to claim 5 wherein the gates of the first MOS transistors of said stages and the first MOS transistor of said output control means are interconnected through inverter means, and wherein the gates of the third MOS transistors of said stages and the second MOS transistors of said output control means are directly interconnected.

7. A microprocessor chip according to claim 6 wherein said output control means further includes for each stage of said I/O register, a third MOS transistor coupling the output of the first inverter in said stage to said accumulator, and a fourth MOS transistor coupling the output of said adder of the junction between the third and fourth transistors of said stage.

8. A microprocessor chip according to claim 7 wherein the gates of the third and fourth transistors of said output control means are interconnected through inverter means to the gates of said second transistor in said output control means and the third transistor in said stages.

* * * * *